Feb. 18, 1969   J. H. ANDERSON   3,427,826
QUICK DISCONNECT FLEXIBLE COUPLINGS AND HUB MOUNTINGS
Filed Feb. 8, 1967

INVENTOR

J. HILBERT ANDERSON

BY Kemon, Palmer
Stewart & Estabrook
ATTORNEYS

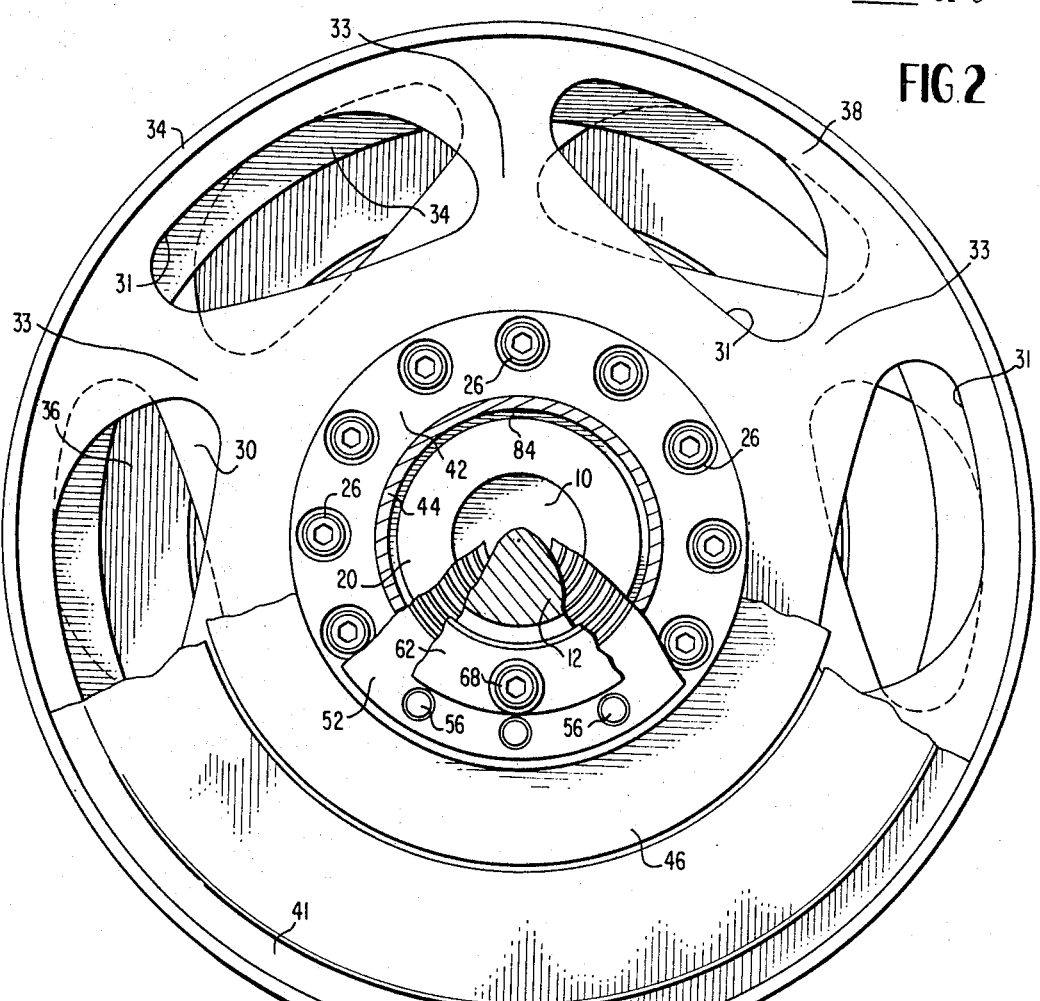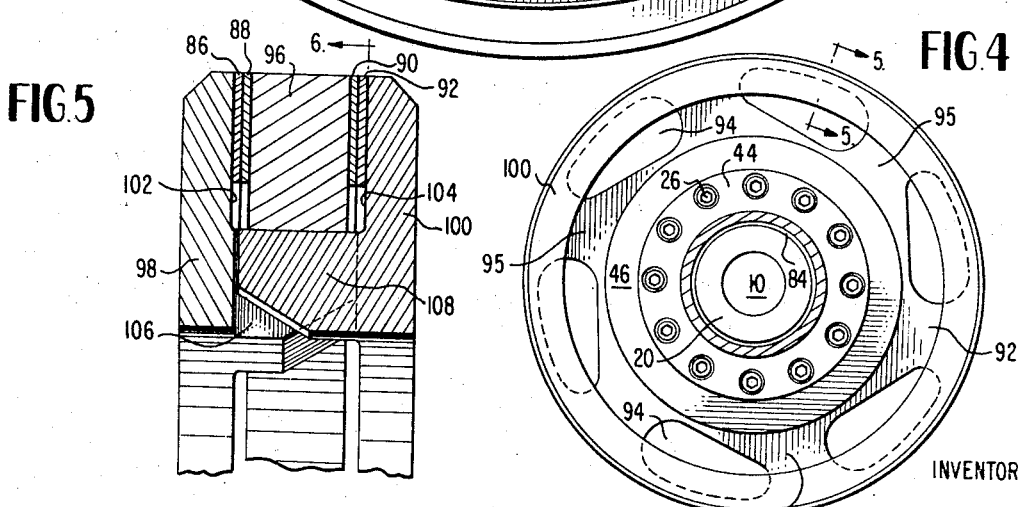

United States Patent Office 3,427,826
Patented Feb. 18, 1969

3,427,826
QUICK DISCONNECT FLEXIBLE COUPLINGS AND HUB MOUNTINGS
James H. Anderson, 1615 Hillock Lane,
York, Pa. 17403
Filed Feb. 8, 1967, Ser. No. 614,707
U.S. Cl. 64—13
Int. Cl. F16d *3/78, 3/56, 1/10*
22 Claims

ABSTRACT OF THE DISCLOSURE

A flexible coupling for connecting two substantially aligned rotating shafts wherein at least one of the said rotating shafts is in pure frictional engagement with the coupling. The coupling members for transmitting torque between the said shafts in each of the preferred embodiments includes at least one flexible disc member, which disc member projects radially outwardly from the shafts such that a signal operated cutting tool may be moved into contact with the disc to thereby sever the coupling and thus, quickly disconnect the shafts from each other.

RELATED PATENTS

This invention is an improvement over that described in my application for Flexible Couplings and Hub Mountings, Ser. No. 366,866, filed May 12, 1964, now Patent No. 3,286,488.

BACKGROUND OF THE INVENTION

Field of the invention

This invention relates broadly to couplings and more particularly to a flexible coupling for connecting two substantially aligned rotatable shafts having high torque transmitting capabilities.

Description of the prior art

Flexible couplings of the prior art and of the type described in my above-noted application have been used generally for the purpose of transmitting torque between two substantially aligned rotating shafts. Such couplings usually have limited application in that they cannot be used for a general purpose machine. One of the principal reasons for the stated limitation is the fact that prior art couplings do not provide means whereby the shafts may be easily disconnected from the coupling. This problem occurs because it is necessary to maintain the shafts in alignment with each other and concentric with the coupling. At the same time it is also necessary that the shafts be tightly clamped to the coupling to thereby prevent end wobble of the shafts and to facilitate the transmission of torque between the shafts.

It is also common in the prior art to use a plurality of struts as the coupling members, the struts generally connect a pair of hubs as shown in my prior application. The hubs are respectively connected to the input and output shafts. The struts of most such couplings are completely enclosed within the two hubs, and are, therefore, not easily accessible for the purpose of releasing one of the rotating shafts from the flexible coupling and the other shaft. In addition, couplings utilizing a plurality of struts permit radial deflection of the coupling and consequently, a certain amount of shaft end wobble occurs. Couplings of this type, of course, are expensive to produce and in addition, are difficult to replace when replacement is required. Finally the flexible coupling of the prior art, including that revealed in my prior application, do not permit a quick disconnect of one of the shafts from the other of the rotating shafts. This latter problem is particularly critical in certain situations such as that where a hydraulic turbine drives an electrical generator.

As is typical in the turbine driven generator case, it sometimes becomes necessary to quickly disconnect the hydraulic turbine from the generator. The necessity for a quick disconnect occurs when the load on the generator is suddenly removed because of a fault in the generator or transmission line. In such a case it is virtually impossible to close the turbine input valves, thus water continues to flow to the hydraulic turbine. Because of the valve closure problem, it is extremely difficult to stop a large hydraulic turbine in a very short time, consequently, with the electrical load removed from the generator and with water still flowing through the turbine, the turbine accelerates to very high speeds. Because of this, generators have to be designed to withstand centrifugal forces produced by the overspeed having values of as much as 170 percent of the normal running speed centrifugal forces. This necessarily means that the cost of constructing the generator is much higher than it would be if the generator did not have to be designed with a built-in overspeed safety factor. Hydraulic turbines, on the other hand, are quite capable of running at high overspeeds without sustaining damage.

An ideal solution to a problem of this sort is to have a flexible coupling interposed between the turbine shaft and the generator shaft, which coupling may be quickly and automatically disconnected by a cutting assembly; the cutting assembly may be responsive to a specific overload signal. The overload signal would either be proportional to the angular velocity of the shafts and may be obtained, for example, from the generator's governor, or it may be proportional to the electrical load on the generator.

It is, therefore, an object of this invention to provide a new and novel flexible coupling for joining a pair of substantially aligned rotating shafts, which coupling may be quickly broken to thereby disconnect the said shafts.

It is an additional primary object of this invention to provide a new and novel hub mounting structure for fixing a rotating shaft to a flexible coupling unit, the said mounting structure being in pure frictional engagement with the said shaft.

It is another object of this invention to provide a new and novel flexible coupling for connecting a pair of substantially aligned rotating shafts, which coupling is inexpensive to produce and is easy to maintain and replace.

It is a further object of this invention to provide new and novel flexible coupling members as a part of a unit for joining two substantially aligned rotating shafts, the said members being relatively rigid radially of the shafts and flexible axially of the said shafts.

It is the further object of this invention to provide a new and novel coupling unit for joining a pair of shafts, which unit is provided with a plurality of hub members; the said hubs being in pure frictional engagement with the said shafts.

It is a further object of this invention to provide a new and novel centering means as a part of a quick disconnect flexible coupling unit for a pair of substantially aligned rotating shafts, which centering means maintains shaft alignment after disconnection of the shafts while same are rotating.

These and other objects of this invention will become apparent upon a reading of the hereinafter to be described embodiments of the invention taken in conjunction with the drawings.

SUMMARY OF THE INVENTION

This invention is directed to a flexible coupling unit having a hub that is in pure frictional engagement with either an input or output shaft of a pair of substantially aligned rotating shafts. The hub is provided with a radially extending annular flange as a mounting means for a flexible coupling member or members which consist of at least one slotted disc that is supported on and radially extend or project from the hub flange. This disc is connected at or near its outer peripheral surface to a second hub which may be either frictionally fixed or frictionally and threadably fixed to the other of the said shafts. A suitable tool may be so positioned that it can be moved into engagement with at least one slotted flexible coupling disc for the purpose of cutting or severing same to thereby disconnect or decouple the input and output shafts.

DESCRIPTION OF THE DRAWINGS

FIGURE 2 is a front sectional view with portions broken away taken on the line 2—2 of FIGURE 1;

FIGURE 4 is a front elevational view of a third embodiment of the present invention;

FIGURE 5 is an enlarged sectional view of a portion of the embodiment of FIGURE 4, the view being taken on the line 5—5;

DESCRIPTION OF THE PREFERRED EMBODIMENTS

Figure 1:
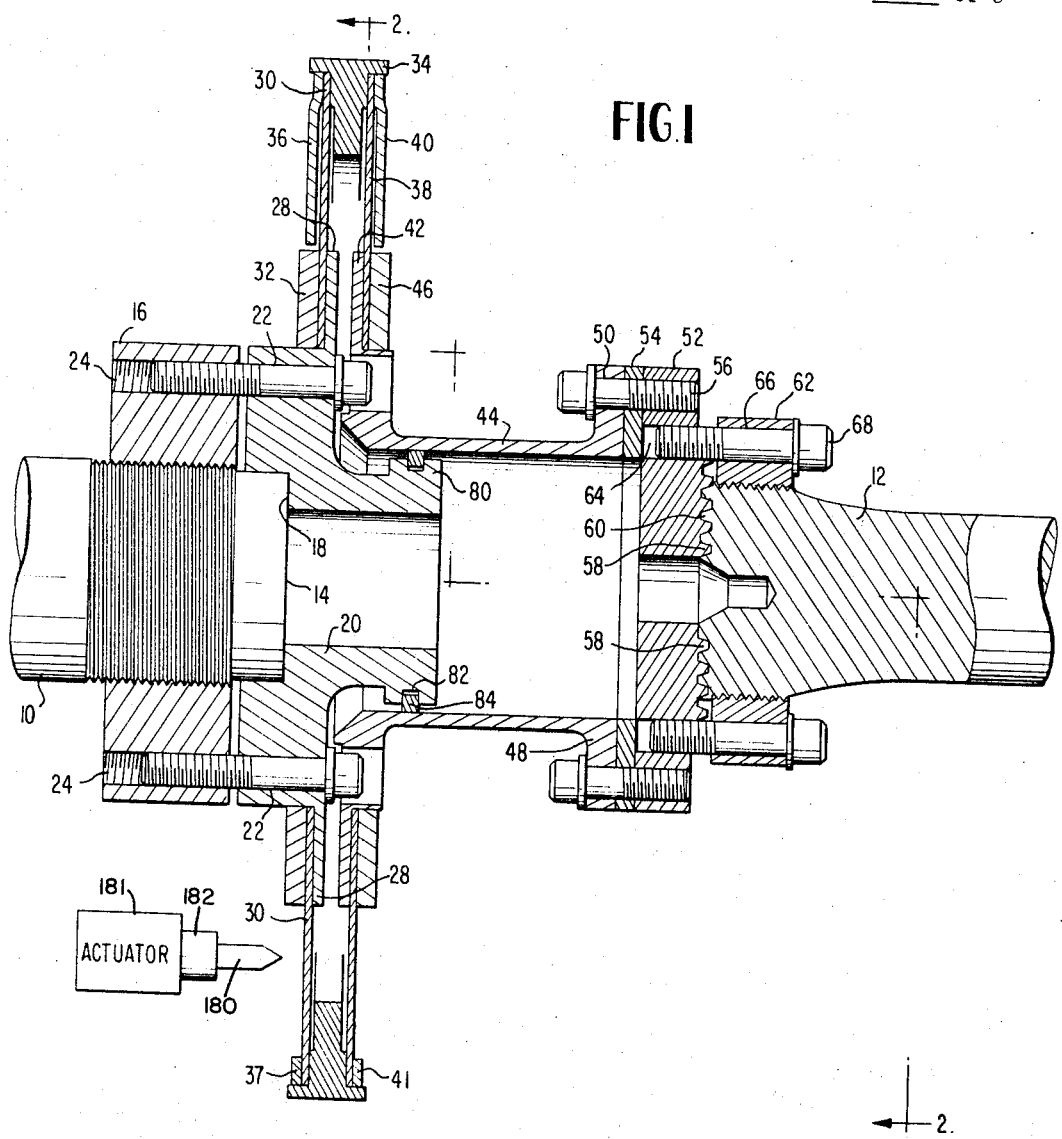
FIGURE 1 is a side sectional view showing a pair of substantially aligned rotating shafts and an embodiment of the flexible coupling unit of this invention.

Referring in particular to FIGURES 1 and 2, an input shaft 10 is shown coupled in substantial alignment to and with an output shaft 12 by a coupling unit made in accordance with the invention. The input shaft 10 is threaded on its outer surface near an end face 14 to thereby threadably support a collar member 16. The shaft end face 14 and the outer circumferential surface of the shaft 10 frictionally engage with the inside surfaces of a concentric bore 18 in a generally cup-shaped hub member 20; the hub being an integral part of the coupling unit. The hub 20 is provided with a plurality of circumferentially spaced bore holes 22, which are aligned with a plurality of corresponding threaded holes 24 in the collar 16. The hub is secured to the collar and displaced therefrom by a plurality of lock bolts 26 threadably received in the aligned holes 22 and 24. In operation torque is frictionally transferred from the shaft 10 to the hub 20 in part by the frictional clamping of the bolts 26 in the holes 22 and 24 respectively. Additional frictional clamping is achieved between the shaft 10 and the hub 20 by the engagement of the shaft end face and adjacent peripheral surface of the shaft 10 with the hub 20 within the bore hole 18. Finally, frictional engagement is also achieved in that the high bolt clamping forces of the bolts 26 in the holes 22 and 24 slightly tilt the cup-shape portion of the hub 20 radially inward on the peripheral surface of the shaft near the end face 14 to thereby provide a high clamping force on the said peripheral surface. This latter described engagement of the hub and shaft also insures the concentricity of the shaft 10 within the hub.

The hub 20 is provided with a radially extending annular flange 28 for mounting and supporting an annular coupling disc 30. The disc is provided with a plurality of spaced slots 31 as shown in FIGURE 2, to thereby define a plurality of spaced radially extending struts 33. The disc may be secured to the flange 28 by conventional means, e.g., a clamping ring 32 to frictionally lock the disc to the flange 28. The coupling disc may also be cemented to flange 28 and clamping ring 32 by conventional adhesives. The disc projects radially outward from the flange and clamping ring and is secured at its outer peripheral surface by being sandwiched between a centering ring 34 and a cover plate or outer clamp ring 36. The disc or coupling member 30 may be secured to the covering plate 36 and the ring 34 by conventional means such as adhesives or the like.

The centering ring 34 is generally T-shaped in cross section and is used to support a second slotted coupling disc 38 in spaced apart relationship with the coupling disc 30. A second covering plate or outer clamping ring 40 is secured to the disc 38 and centering ring 34 in a manner such as that described relative to the securing of disc 30 to ring 34 and plate 36. The disc 38 is secured near its inside periphery to a radially extending peripheral flange 42 of a second hub or sleeve member 44. The flexible coupling member 38 is clamped to the flange 42 by a clamping ring 46 in the same manner in which the disc 30 is clamped to flange 28 of the hub 20. Cover plates 36 and 40 are not necessary to the coupling operation. They are used for the purpose of shielding the coupling discs from dirt and the like. In the alternative, only the outer portion of the cover plates, i.e., the rings 37 and 41 shown in the bottom portion of FIGURE 1 may be used to clamp the discs to the centering ring 34.

The sleeve 44 extends axially in the direction of the output shaft 12 and terminates in a radially extending annular flange 48, FIGURE 1, which is provided with a plurality of circumferentially spaced bore holes near its outer peripheral surface. A spacer member 54 abuts the flange 48 and is secured thereto and to a hub 52 by a plurality of bolts 56 which extend through said flange and spacer and are anchored in threaded bore holes in the hub 52.

The hub 52 is fixed to the shaft 12 by a spiral thread 58 on one end face of the hub 52, which thread engages a similar thread 60 on an end face of the shaft 12. Additional coupling is achieved between the shaft 12 and the hub 52 by bolting a collar 62 to the hub. For this purpose, the hub and collar 62 are each provided with a plurality of axially aligned threaded bore holes 64 and 66 respectively for receiving threaded lock bolts 68. The collar 62 is threadably supported on the outer surface of the shaft 12 near the threaded end face of said shaft.

In operation torque is transferred from the shaft 10 to the hub 20 as heretofore described. The torque path from the hub 20 is through the slotted disc 30, the centering ring 34 and thence to the disc 38 and sleeve 44. Torque is then frictionally and threadably transferred from the sleeve 44 through the bolts 56 and 68 and end face threads 58 and 60 of the hub 52 and shaft 12 respectively. Torque is also transferred from the sleeve 44 to the hub 52 through the frictional engagement of the sleeve with the spacer and the spacer with the hub.

In some applications, it may be desirable to dispense with hubs, such as the hub 52, that utilize an Archimedean screw for connection to a similar screw on the end face of an output shaft. In such cases it is possible to use a second hub like the hub 20 to couple the output of the flexible coupling to an output shaft. In cases of this type, a cup-shaped hub similar to the hub 20 would be substituted for the hub 52, however, such a hub would not require an annular flange such as the flange 28. A specific embodiment, somewhat different from that just described, of a pure friction coupling has been shown in FIGURE 3 of the drawings. As described with respect to FIGURES 1 and 2, the input shaft 10 is connected to a first flexible coupling by a collar 16 and a hub 20. Torque is transmitted from the shaft 10 through the coupling to the sleeve 44 as described above. The sleeve 44 is secured by bolts 56 to the spacer 54 and a radially extending annular flange 70 of a second sleeve or hub 72. The sleeve 72 is the mirror image of the sleeve 44 and is a part of a second coupling unit that also includes a coupling disc section 74, a hub 76, and collar 78. Each of the named elements are the mirror image of their respective counterparts, i.e., collar 16, hub 20 and the flexible disc arrangement previously described. The hub 76 is in frictional engagement with the shaft 12 in the precise manner with which the hub 20 is in frictional engagement with the shaft 10, that is by being bolted to the collar 78 and having the end face of the shaft frictionally engaged within the hub 76 in a centrally disposed annular concentric bore hole.

Figure 3:
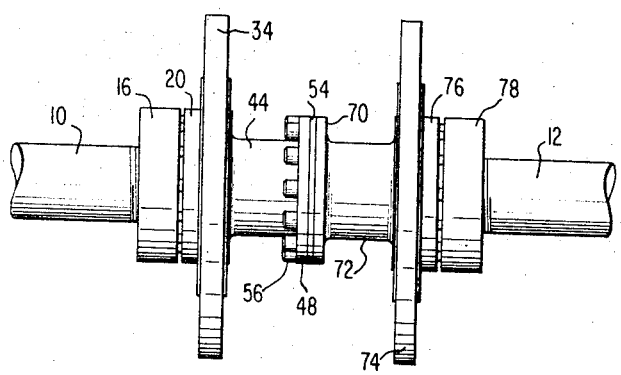
FIGURE 3 is a side elevation of a second embodiment of the coupling of this invention and shows the coupling of FIGURE 1 and a mirror image of same for joining a pair of substantially aligned shafts.

Obviously, the shaft 12 of the embodiment shown in FIGURE 3 would not require an Archimedean screw on its end face. The embodiment of this invention shown in FIGURE 3 of the drawings is a modification of FIGURE 1 wherein pure frictional couplings to the input and output shafts are utilized, and because of this, it is capable of use in general purpose machines. Because of the use of lock bolts such as the bolts 26, FIGURE 1, the coupling may be quickly disengaged from either the input or output shafts or both for maintenance purposes or the like.

In the embodiment shown in FIGURE 3 of the drawings, it sometimes happens that the sleeves 44 and 72 oscillate axially in the direction of either the shaft 10 or the shaft 12. In order to provide a dampening force or to reduce such oscillations, the hub 20, see FIGURE 1 of the drawings, is provided with an axially extending projection 80 which extends into the sleeve or driven hub 44. Projection 80 is provided with an annular slot 82 on its outer peripheral surface for mounting and supporting a conventional split piston ring 84. When the shafts 10 and 12 are in rotation, the piston ring 84 engages the inner surface of the sleeve to thereby add a frictional force between the sleeve and the hub. This frictional force occurs in part because of the natural resiliency of the piston ring, and also due to the centrifugal forces produced during the rotation of the shafts 10 and 12 which forces tend to move the ring out of the slot 82 and into engagement with the sleeve 44. The provided damper operates such that any tendency of the coupling unit to move axially of the shafts is opposed by the frictional engagement of the piston ring with the hub and sleeve. Although it is not shown in FIGURE 3 of the drawings, the hub 76 is also provided with a projection such as the projection 80 and a piston ring such as the piston ring 84 for precisely the same reasons. Thus, with the two piston rings adding friction between the respective hubs and sleeves any axial movement of the flexible couplings is to all practical purposes dampened out.

A third embodiment of the invention is shown in FIGURES 4 through 8 of the drawings. Referring now to FIGURES 4 and 5, the shaft 10 is frictionally coupled to the hub 20 in precisely the manner described with respect to FIGURES 1 and 2 of the drawings. The major difference between this embodiment and the embodiment previously described is that a pair of coupling discs 86 and 88 in parallel relation to one another are clamped to the annular flange 28 of the hub 20 by the ring 32 in lieu of the single disc 30 of FIGURE 1. The discs 86 and 88 are cemented together by any well known adhesive. The disc 88 may be cemented to the flange 28 and to the disc 86. Similarly the disc 86 may be cemented to the clamping ring 32. In a like manner, a pair of discs 90 and 92 are supported by the annular flange 42 of the sleeve 44 in lieu of the single disc 38 shown in FIGURE 1, and are secured thereto through the use of adhesives and the clamping ring 46. All of the discs 86 through 92 are provided with slots 94 as shown in FIGURE 4, which are located near the outer peripheral edge of each of the discs. The slots are spaced to define individual struts 95 between each pair of slots 94 for each disc. When the discs are axially aligned, the slots are superimposed in a staggered relationship much like that shown in FIGURE 2 of the drawings. Alternatively, as shown in FIGURE 4, the slots may be lined up without utilizing the staggered relationship.

The discs 86 and 88 are secured together and slightly separated from each other by cement or other adhesive materials near their outer peripheral or circumferential surfaces. In a like manner, the discs 90 and 92 are also secured together. The coupling discs 88 and 90 as seen in FIGURE 5 of the drawings are also secured to a centering ring 96 by adhesive or any other sort of cementing material by which steel may be bonded to steel. The outer peripheral surface of the ring 96 does not extend or project radially beyond the outer peripheral surfaces of the coupling discs 86 through 92 in order that the outside diameter of the coupling unit may be minimized.

Figure 6:
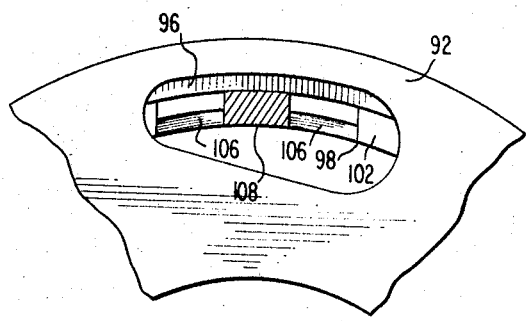
FIGURE 6 is a sectional view of a detailed portion of the embodiment of FIGURE 4, the view being taken on line 6—6 of FIGURE 5.
Figure 7:
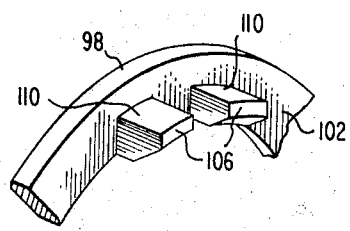
FIGURE 7 is a perspective view of the left-hand clamp ring shown in FIGURE 5.
Figure 8:
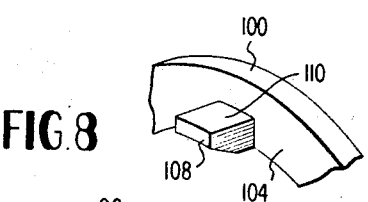
FIGURE 8 is a perspective view of the right-hand clamp ring shown in FIGURE 5.

The disc 86 is cemented to the inside surface 102 of a clamping ring 98, and the disc 92 is similarly secured to the inside surface 104 of a clamping ring 100. The clamping rings used in this embodiment of the invention take the place of the plates 36 and 40 shown in FIGURE 1 of the drawings. They differ from the said plates in that each of the rings 98 and 100 is provided with a plurality of circumferentially spaced apart lugs 106 and 108 respectively extending at right angles from the surfaces 102 and 104. The lugs 106 are grouped in circumferentially spaced apart pairs, and they extend through the slots 94 in each of the four flexible discs. There is one lug 108 for each pair of lugs 106 and the lugs 108 also extend through the slots 94. The lugs 108 frictionally engage with the lugs 106 as shown in FIGURE 6, thus locking the flexible rings, clamping rings and centering ring together to thereby form the said members into an integral flexible coupling unit, which unit is relatively stiff radially of the shafts and flexible axially of same.

In operation power transmission takes two parallel paths as follows: torque is transmitted from the hub 20 to the coupling disc 86 and thence to the clamping ring 98, through the lugs 106 and 108 to the clamping ring 100, and thence to the coupling disc 92 and to the sleeve 44; and torque is also transmitted from the hub 20 to the coupling disc 88 through the centering ring 96 to the coupling disc 90 and from the coupling disc 90 to the sleeve 44 and thence as before described.

The embodiment described above relative to FIGURES 4 through 8 of the drawings permits the use of four flexible coupling discs as opposed to the discs 30 and 38 described with respect to FIGURE 1. The structure as it relates to the hub, collar and sleeve construction described in this third embodiment is the same as that described in previous embodiments. This type of design permits each of the discs to be thinner than the two discs described heretofore, which in turn allows each of the discs to have a smaller outside diameter for any given amount of bending deflection. Thus, in one model of the flexible coupling that has been built, the outside diameter of the discs 30 and 38 of FIGURE 1 was 7.50 inches. For the embodiment shown in FIGURES 4 through 8 of the drawings the required outside diameter of the discs 86 through 92 is 6.90 inches for the same bending deflection. The smaller diameter for the coupling discs utilized in the embodiment shown in FIGURES 4 through 8 of the drawings permits a lighter coupling capable of higher rotative speed than in the embodiment described with respect to FIGURES 1 and 2. This, of course, is due to the fact that the rim speed of the smaller discs is lower and thus, the centrifugal stresses placed on the coupling discs of the embodiment shown in FIGURES 4 through 8 of the drawings are less.

A fourth embodiment of this invention will be described with respect to FIGURE 9 of the drawings. As previously described, the input shaft 10 is provided with threads near its end face and the collar 16 is threadably mounted thereon. The shaft 10 is frictionally coupled to a cup-shaped hub 150 which is provided with a bore 154 and a counterbore 152; the diameter of the counterbore 152 is approximately equal to the diameter of the shaft 10. The diameter of the bore 154 is smaller than that of the bore hole. The shaft 10 frictionally engages with the surfaces of the counterbore in the hub as heretofore described with respect to engagement of the shaft 10 in the bore hole 18 of the hub 20; see FIGURE 1 and the description supra. In a like manner, the hub 150 is also provided with a plurality of bore holes 156, which holes communicate with axially aligned holes 24 in the collar 16 for the purpose of receiving the lock bolts 26. Torque is transmitted from the shaft 10 to the hub 150 in precisely the same manner as described relative to the shaft 10 and the hub 20.

The hub member 158 is connected to a shaft 12 in the manner as disclosed with respect to FIGURE 1. The hub 158 is provided with a radially projecting annular flange 160 having a rim 161 with spaced apart pin holes 162 therein and extending therethrough. The flange 160 is angled to thereby partially surround or encompass the hub 150. The hub 150 is formed with an annular radially extending portion 164, which has a plurality of equispaced holes 166 that intersect an annular slot 168. A pair of struts 170 and 171 are disposed in the slot 168 and are secured to the hub 150 by pins 172. The struts 170 and 171 are positioned and connected at their outer ends to the rim 161 by an annular member 176 and a plurality of pins 174, which project through said annular member and the holes 162. Each of the struts 170 and 171 are formed with flat portions where the thickness of each of the said portions is less than one-half of the total strut axial thickness. In the embodiment shown in FIGURE 9, the strut members cross each other and are disposed in mating relationship to thereby allow the alignment of the strut ends in coplanar fashion such that the said ends may be secured to the hubs as aforestated.

Figure 9:
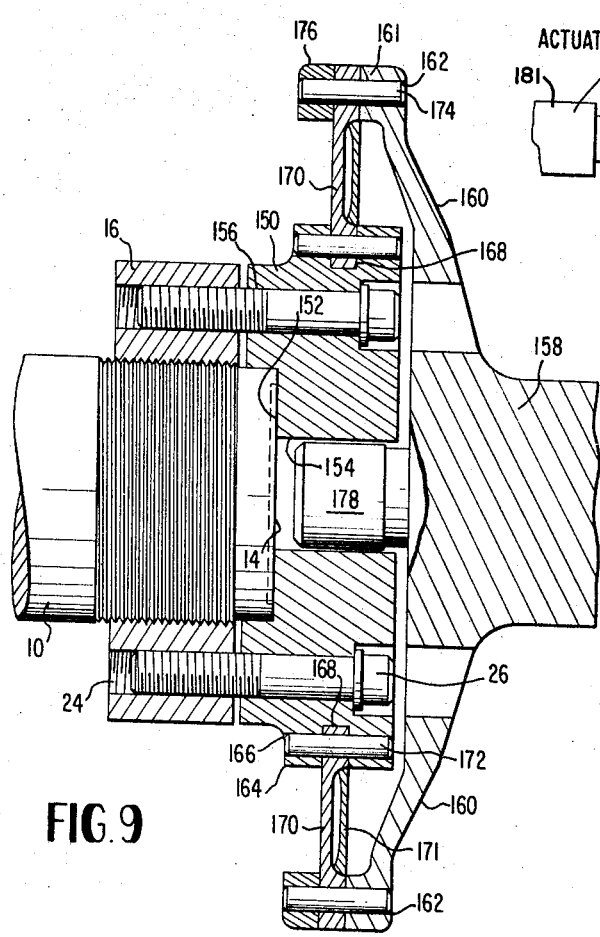
FIGURE 9 is a side sectional view of a fourth embodiment of the present invention.

In the embodiment of this invention shown in FIGURE 9 of the drawings, the hub 158 is also provided with an axially projecting member 178 that extends into the bore 154 of the hub 150. The projection 178 acts as a centering bearing when the relative speed of the hubs 150 and 158 are different which speed difference may be, and in the usual case is, caused by the cutting of the struts 170 and 171. The projection thus necessarily can have the configuration of a roller bearing and in the situation described would perform the function of such bearing. Obviously, a sleeve bearing could be substituted for the described roller bearing. Its main function is to maintain the hubs 150 and 158 in concentric relation with each other when the speeds of the two hubs are different thus maintaining the shafts 10 and 12 in substantial axial alignment.

Figure 10:
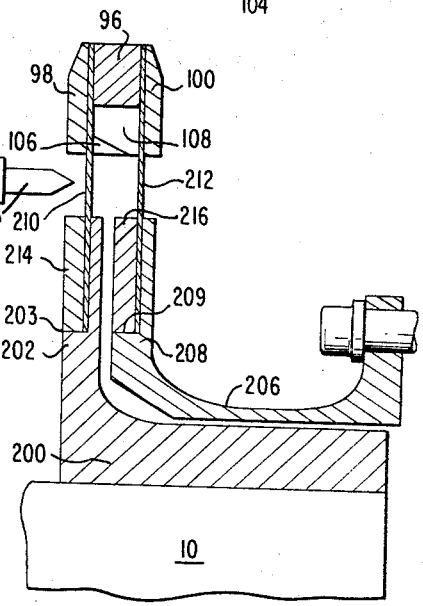
FIGURE 10 is a side sectional view of a fifth embodiment of the present invention.

In all of the previously described embodiments the ends of the shafts 10 and 12 are axially separated or spaced from each other. However, the flexible coupling of this invention may also be used to connect a pair of shafts that are immediately adjacent each other, thus the embodiment shown in FIGURE 10 of the drawings may be used in place of a prior art gear coupling. As shown in FIGURE 10 of the drawings, an annular hub 200 having a radially extending flange 202 with a shoulder 203 thereon is frictionally fixed to the end of the shaft 10 as by being keyed thereto in a shaft keyway. Alternatively, the hub 200 may be press-fitted to the shaft end. A second hub or sleeve member 206 encompasses or encircles the greater portion of the hub 200. The hub 206 is similar in structure and function to the sleeve 44, see FIGURE 1. It is fixed to the shaft 12 in the same manner as the sleeve 44 is fixed thereto or to a mirror image sleeve 44 such as the sleeve 72 shown in FIGURE 3. The hub 206 is provided with a radially extending flange 208 having a shoulder 209 thereon. A flexible coupling unit similar in structure to the unit shown in FIGURES 4 through 8 is mounted on the shoulders 203 and 209 and projects radially from the hubs 200 and 206. Common element designators from the said figures have been employed in FIGURE 10. As shown in FIGURE 10, two slotted disc members 210 and 212 respectively are used with the coupling unit. Obviously, the four discs 86-92 could have been used in the alternative. Each of the discs 210 and 212 are secured to the hubs 200 and 206 respectively by clamping rings 214 and 216. The discs are secured near their outer peripheries as heretofore described.

In each of the heretofore described embodiments of this invention, the construction of the coupling units is such as to leave sufficient room for a signal-actuated cutting tool such as a knife blade 180, see FIGURES 1 and 10, to be moved axially so as to cut the flexible dics(s). Thus, in FIGURE 1 of the drawings, the tool may be mounted such that upon actuation, it moves so as to cut the disc 38 and thereby sever the torque transmission path between the shafts 10 and 12. As heretofore described, this is desirable in that, e.g., a generator shaft can thus be quickly disconnected from the turbine shaft in the event of an electrical failure causing the removal of the load on the generator. In such a case, when the rotational speed of the generator shaft increases to the maximum safe level, a conventional governor or other conventional speed control and sensing device 181 can be utilized to actuate a piston 182, said knife blade 180 being supported by the piston for movement therewith, to thereby engage the blade 180 with the coupling disc 30. Only one cutting tool is necessary to perform the desired function for each of the embodiments, e.g., in the second embodiment only one of the coupling discs need be cut. In the third embodiment two of the discs, either the discs 86 and 88 or the discs 90 and 92 would have to be severed. In this last-named case, the cutting tool is actuated into the space left between the inner, e.g., 46, and outer, e.g., 100, clamping rings. In the fourth embodiment the tool must be moved axially between the radial extensions of the hubs 150 and 158 to cut the struts 170 and 171.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:
1. A quick disconnect flexible coupling for connecting two substantially aligned shafts comprising;
   a member secured to a first of said shafts adjacent an end thereof;
   a first hub having a bore therein for receiving and engaging the end of said first shaft, means carried by said hub and engaging said member for initially centering said bore of said hub upon said end of said first shaft and then tilting said hub inwardly until the bore thereof grips said end of said first shaft and said hub is frictionally clamped to the end of said first shaft and secured to said member;
   a second hub connected to an end of the second of said shafts, said second hub being fixed to said second shaft in spaced-apart opposing relationship to said first hub;
   a coupling unit interposed between and supported by said first and second hubs, said coupling unit including at least one flexible disc member; said disc being supported such that it is relatively flexible in the axial direction of said shafts and relatively rigid radially of said hub; and
   means positioned adjacent to said disc member and operatively associated with at least one of said shafts for engaging and cutting said disc member upon acutation to thereby effect a disconnect of said shafts.

2. A quick disconnect flexible coupling according to claim 1 wherein said flexible disc member is slotted such that a plurality of spaced struts are defined between inner and outer peripheral edges of said disc member.

3. A quick disconnect flexible coupling according to claim 1 wherein at least a portion of one of said hubs is encircled by at least a portion of the other of said hubs.

4. A quick disconnect flexible coupling according to claim 1 wherein said first hub comprises an annular member having a radially extending flange with a shoulder thereon;

and wherein said second hub comprises an annular member having a first radially extending flange with a shoulder thereon and a second radially extending flange, said second hub encircling at least a portion of said first hub and being secured to said other shaft by said second flange;

said coupling unit being mounted on said flange of said first hub and said first flange of said second hub and affixed thereto by clamping rings frictionally engaging with said shoulders.

5. A quick disconnect flexible coupling according to claim 4 wherein said first hub is provided with a key for frictionally engaging in a keyway in said first shaft.

6. A quick disconnect flexible coupling for connecting two substantially aligned shafts comprising:

a collar secured to a first of said shafts adjacent an end thereof;

a first hub having a centrally disposed annular bore hole therein for receiving and engaging the end of said first shaft, means carried by said hub and engaging said collar for initially centering said bore hole upon said end of said first shaft and then tilting said hub inwardly until the bore hole grips said end of said first shaft and said hub is frictionally clamped to the end of said first shaft and secured to said collar;

a driven member provided with a radially extending flange;

mounting means for fixing said driven member at one end to the second of said shafts and for supporting said driven member such that its flange is adjacent to and axially spaced from said first hub; and flexible coupling means rigidly attached to said first hub and to said flange of said driven member for transmitting torque therebetween.

7. A quick disconnect flexible coupling according to claim 6 wherein said first hub is provided with a radially extending annular flange, the flange of said driven member being supported adjacent to said hub flange and wherein said flexible coupling means comprises:

a first slotted disc rigidly attached to said flange of said first hub and projecting radially therefrom;

a second slotted disc rigidly attached to said flange of said driven member and projecting radially therefrom, each of said discs being relatively rigid in their radial direction and relatively flexible in the axial direction of said shafts; and a coupling ring rigidly attached to the outer peripheral surface of each of said discs for transmitting torque therebetween.

8. A coupling according to claim 7 wherein each of said coupling discs is made out of high strength flexible steel.

9. A quick disconnect flexible coupling according to claim 6 wherein said first hub is provided with a radially extending annular flange, the flange of said driven member being supported adjacent to said hub flange and wherein said flexible coupling means comprises:

first and second slotted discs rigidly attached to said flange of said first hub and extending radially therefrom, said first and second discs being supported such that they are closely adjacent to each other and displaced from each other in the axial direction of said shafts;

third and fourth slotted discs rigidly attached to said flange of said driven member and extending radially therefrom, said third and fourth discs being supported such that they are closely adjacent to each other and displaced from each other in the axial direction of said shafts; and clamp means rigidly attached to said first, second, third and fourth discs near the outer peripheral surfaces thereof for transmitting torque between said discs and for maintaining said discs in spaced-apart relationship to each other at their outer peripheral edges.

10. A coupling according to claim 9 wherein said first and second discs are secured to each other near their outer peripheral surfaces and said third and fourth discs are secured to each other near their outer peripheral surfaces and wherein said clamp means further comprises:

a first claimping ring rigidly attached to said first slotted disc;

a second clamping ring rigidly attached to said fourth slotted disc, each of said rings having spaced-apart axially extending lugs, said lugs of said first ring being in frictional engagement with said lugs of said second ring and extending through said slots in said discs; and a third centering ring rigidly attached to said second and third discs and supported on said lugs.

11. A coupling according to claim 6 wherein said first shaft is threaded on its outer surface adjacent to said shaft end that is frictionally engaged by said first hub, and wherein said first hub is secured by a plurality of spaced-apart bolts to a collar, said collar being threadably mounted on said shaft adjacent to said shaft end.

12. A coupling according to claim 6 wherein said driven member is a hollow sleeve and wherein said first hub is provided with an axially extending annular projection, said projection extending into said sleeve, and said projection being provided with an annular slot on its outer surface; and a split piston ring mounted in said slot, said piston ring being in frictional engagement with an inside surface of said sleeve when said sleeve is rotatably driven by said shafts.

13. A quick disconnect flexible coupling according to claim 6 wherein said first hub is provided with a radially extending annular flange, the flange of said driven member being supported adjacent to the flange of said hub, and wherein said mounting means comprises:

a second driven member rigidly attached to said first driven member and being displaced therefrom, said second driven member being provided with a radially extending annular flange;

a second hub having a centrally disposed annular bore hole therein, the second of said shafts being frictionally engaged with said second hub within said bore hole, said second hub being provided with a radially extending annular flange; and flexible coupling means rigidly attached to said flanges of said second driven member and said second hub for transmitting torque therebetween, said means including at least two slotted disc members supported by and projecting radially from said flanges, said discs being supported in spaced relationship near their outer peripheries.

14. A coupling according to claim 13 wherein said second hub is bolted to a collar member, said collar member being threadably supported on said second shaft.

15. A quick disconnect coupling according to claim 6 wherein said mounting means comprises:

a second hub rigidly attached to an end face of a second of said shafts by an Archimedean screw, said driven member being bolted to said second hub; and a collar member threadably supported by the shaft end near the said end face of the second of said shafts, said collar being bolted to said second hub.

16. A quick disconnect flexible coupling according to claim 6 wherein said first hub is provided with a radially extending annular flange; and an annular slot on the outer peripheral surface of said flange, said flexible coupling means being rigidly supported within said slot.

17. A quick disconnect flexible coupling for connecting two substantially aligned shafts, each of said shafts being provided with threaded surfaces substantially adjacent to at least one of the end faces of each of said shafts comprising:
- a first annular collar member threadably supported on a first of said shafts, said collar being provided with a plurality of circumferentially spaced-apart threaded holes, said holes extending in the axial direction of said collar;
- a first hub having a first radially extending annular flange and a concentric bore hole, said first shaft being in frictional engagement with said first hub within said bore hole, said hub being provided with a plurality of circumferentially spaced-apart threaded holes in said first flange, said threaded holes being in axial alignment with said holes of said first collar, a plurality of threaded lock bolts in said holes in said first collar and said first hub to lock same together, a second radially extending annular flange projecting radially outward from said first flange of said first hub;
- a first slotted flexible disc member secured to said second flange of said first hub and projecting radially outward therefrom;
- a first clamp ring secured to said first disc member for locking same to said first hub;
- a sleeve member provided with radially extending annular flange at each end, one of said flanges being provided with a plurality of circumferentially spaced-apart axially extending bore holes;
- a second slotted flexible disc member secured to the other of said flanges of said sleeve member and projecting radially therefrom;
- a second clamp ring secured to said second disc member for locking same to said sleeve;
- a centering ring secured to each of said slotted flexible disc members near the outer peripheral surfaces of said disc members;
- a second hub member, said hub member being provided with two radially separate groups of threaded holes, the holes in each of said groups being circumferentially spaced apart from each other, the holes of one of said groups being in axial alignment with said bore holes of said sleeve member;
- a spacer member, said member being provided with a plurality of threaded holes, said holes being in axial alignment with said bore holes of said sleeve member;
- said sleeve member being fixed to said spacer member and said second hub by lock bolts threadably engaged with said axially aligned holes in said members; and
- a second annular collar member threadably supported on the second of said shafts, said collar being provided with a plurality of circumferentially spaced-apart threaded holes, said holes being in axial alignment with the other group of holes in said second hub member, said second collar member being fixed to said second hub member by lock bolts threadably engaged with said aligned holes.

18. A quick disconnect flexible coupling according to claim 17 wherein said second hub member is provided with a spiral screw on an end face thereof, which screw engages a similar screw on an end face of said second shaft.

19. A quick disconnect flexible coupling according to claim 17 wherein said second hub is provided with a concentric bore hole, and wherein said second shaft is in frictional engagement with said second hub within said bore hole.

20. A quick disconnect flexible coupling for connecting two substantially aligned shafts, each of said shafts being provided with threaded surfaces substantially adjacent to at least one of the end faces of each of said shafts comprising:
- a first annular collar member threadably supported on a first of said shafts, said collar being provided with a plurality of circumferentially spaced-apart threaded holes, said holes extending in the axial direction of said collar;
- a first hub having a first radially extending annular flange and a concentric bore hole, said first shaft being in frictional engagement with said first hub within said bore hole, said hub being provided with a plurality of circumferentially spaced-apart threaded holes in said first flange, said threaded holes being in axial alignment with said holes of said first collar, a plurality of threaded lock bolts in said holes in said first collar and said first hub to lock same together, a second radially extending annular flange projecting radially from said first flange of said first hub;
- a first pair of concentric axially spaced-apart slotted flexible disc members secured to said second flange of said first hub member and projecting radially outward therefrom;
- a first clamp ring secured to said first pair of disc members for locking same to said first hub;
- a sleeve member provided with radially extending annular flanges at each end, one of said flanges being provided with a plurality of circumferentially spaced-apart axially extending bore holes;
- a second pair of concentric axially spaced-apart slotted flexible disc members secured to the other of said flanges of said sleeve member and projecting radially therefrom;
- a second clamp ring secured to said second pair of disc members for locking same to said sleeve member;
- a centering ring secured to each of said pairs of slotted flexible disc members adjacent to the outer peripheral surfaces of said pairs;
- a pair of clamping rings, one each of said rings being secured to one each of said pairs of slotted flexible members adjacent to the outer peripheral surfaces of said pairs, each of said clamping rings being provided with a plurality of spaced-apart axially extending lugs, said lugs of one of said clamping rings being in locking engagement with the lugs of the other of said clamping rings;
- a second hub member, said hub member being provided with two radially separated groups of threaded holes, the holes in each of said groups being circumferentially spaced apart from each other, the holes of one of said groups being in axial alignment with said bore holes of said sleeve member;
- a spacer member, said member being provided with a plurality of threaded holes, said holes being in axial alignment with said bore holes of said sleeve member;
- said sleeve member being fixed to said spacer member and said second hub by lock bolts threadably engaged with said axially aligned holes in said members; and
- a second annular collar member threadably supported on the second of said shafts, said collar being provided with a plurality of circumferentially spaced-apart threaded holes, said holes being in axial alignment with the other group of holes in said second hub member, said second collar member being fixed to said second hub member by lock bolts threadably engaged with said aligned holes.

21. A quick disconnect flexible coupling according to claim 20 wherein said second hub member is provided with a spiral screw on an end face thereof which screw engages a similar screw on an end face of said second shaft.

22. A quick disconnect flexible coupling according to claim 20 wherein said second hub is provided with a concentric bore hole, and wherein said second shaft is in frictional engagement with said second hub within said bore hole.

References Cited

UNITED STATES PATENTS

| | | | |
|---|---|---|---|
| 919,112 | 4/1909 | Zinke | 287—130 |
| 1,025,875 | 5/1912 | Lambert | 64—12 |
| 2,862,375 | 12/1958 | Miller | 64—28 |
| 2,871,683 | 2/1959 | Hallewell | 64—13 |
| 2,982,117 | 5/1961 | Erpenstein | 64—9 |
| 2,997,863 | 8/1961 | Stone et al. | 64—13 |
| 3,041,857 | 7/1962 | Anderson et al. | 64—13 |
| 3,286,488 | 11/1966 | Anderson et al. | 64—12 |

HALL C. COE, *Primary Examiner.*

U.S. Cl. X.R.

64—28; 287—129